United States Patent
Huch et al.

(10) Patent No.: US 6,421,770 B1
(45) Date of Patent: Jul. 16, 2002

(54) BUFFER MEMORY CONFIGURATION HAVING A MEMORY BETWEEN A USB AND A CPU

(75) Inventors: Martin Huch; Jens Barrenscheen, both of München; Gunther Fenzl, Höhenkirchen-Siegertsbrunn, all of (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/120,160

(22) Filed: Jul. 21, 1998

(30) Foreign Application Priority Data

Jul. 21, 1997 (DE) .......................................... 197 31 204

(51) Int. Cl.⁷ .............................................. G06F 12/02
(52) U.S. Cl. .......................... 711/209; 711/202; 710/56
(58) Field of Search ................................ 711/202, 209, 711/173; 710/56, 52

(56) References Cited

U.S. PATENT DOCUMENTS

| | | | |
|---|---|---|---|
| 4,862,419 A | | 8/1989 | Hoberman |
| 5,687,395 A | * | 11/1997 | Spencer ........................ 710/52 |
| 5,805,606 A | * | 9/1998 | Robertson et al. ........... 714/718 |
| 5,946,715 A | * | 8/1999 | Hartog et al. ................ 711/207 |

FOREIGN PATENT DOCUMENTS

| | | |
|---|---|---|
| DE | 44 33 692 A1 | 3/1996 |
| EP | 0 493 834 A2 | 7/1992 |

OTHER PUBLICATIONS

"High-speed FIFO's contend with widely differing data rates" (Miller), System Design/Integrated Circuits, Sep. 1, 1985 pp. 83-86.

"Semiconductor-Circuit Engineering" (Tietze et al.), pp. 285-288.

"First-In-First-Out Memories (FIFO's)", Semiconductor Memories, pp. 256-263.

"Program-Controlled Paging Scheme for Memory Expansion" (Skelton), Technical Disclosure Bulletin, vol. 25, No. 7B, Dec. 1982.

Tim Olson: "Variable-width FIFO buffer sequences large data words", Electronic Design, 37 Jun. 11, 1987, No. 14, Hasbrouck heights, NJ, USA, pp. 117-122.

IBM Technical Disclosure Bulletin, vol. 32, No. 4B, Sep. 1989: "Memory Architecture Supporting Two 8-Bit/Pel Images or One 16-Bit/Pel Image".

* cited by examiner

Primary Examiner—B. James Peikari
(74) Attorney, Agent, or Firm—Laurence A. Greenberg; Werner H. Stemer; Gregory L. Mayback

(57) ABSTRACT

The buffer memory configuration has a memory disposed between a USB and a central processing unit. The memory can be mapped onto an address space which is exactly half as large as the memory itself. The first half of the memory defines a first memory page and the second half of the memory defines a second memory page, and each address in the address space is assigned exactly one memory location on each of the memory pages. A memory management unit generates a first significant bit which assigns in each case the two memory locations having the same address to the address space of the first memory page and to the address space of the second memory page. The buffer memory architecture enables the memory independently to manage the data to be transferred. The two memory pages serve to decouple the central processing unit CPU and the bus. Both memory pages are virtually visible to the user but only one of the memory pages can ever be addressed for data transfer. Consequently, overlapping of the writing cycles is avoided by arranging the transmitted data and the data to be read out in separate areas of the memory.

19 Claims, 6 Drawing Sheets

BUFFER MEMORY CONFIGURATION HAVING A MEMORY BETWEEN A USB AND A CPU

BACKGROUND OF THE INVENTION

Field of the Invention

The invention relates to a buffer memory configuration, which is disposed between a data transmitter and a data receiver for the purpose of data communication, which is connected to the transmitter and the receiver via signal lines, which includes at least one memory for data buffering, and which has a memory management unit that controls reading from and writing to the memory via an address/data bus.

Buffer memories of this type are generally known as first-in, first-out memories (FIFO). The implementation of such a FIFO is described, for example, in *Electronic Circuits: Design and Applications*, U. Tietze and Ch. Schenk, Springer-Verlag, Berlin 1991, pp. 254–262.

A FIFO is a special form of a shift register. The common feature of such a shift register is that the data appear at the output in the same order as they were entered at the input: the first word read in (first-in) is thus read out first (first-out) as well. In contrast to a shift register, however, this operation can take place fully synchronously in a FIFO, i.e., the read-out clock is decoupled from the read-in clock.

In modern FIFOs, the data are no longer shifted, rather input and output addresses are specified in a memory module by means of two pointers, the so-called write pointer and the read pointer. In that case, the write pointer points to the first free address, while the read pointer points to the last address occupied. The pointers are usually realized by simple counters. The memory module is typically a random access memory (RAM).

A further FIFO of the generic type is described in German Published, Non-Proscuted Patent Application DE 44 33 692 A1. FIG. 1 of that application shows such a FIFO, in which a sector of a memory area, which may be arranged in a random access memory (RAM), for example, is mapped. The addressed memory area in this case comprised addresses 22, 23, . . . 31. In FIG. 1A, the data words D1–D4 are written to the memory locations having the addresses 24, 25, 26 and 27. The read pointer RP points to the memory location having the address 24 and the write pointer WP to the memory location having the address 28.

If two further data words are then intended to be written to the queue (D5 and D6), then the data word D5 is written to the memory location having the address 28 and the data word D6 to the memory location having the address 29 (FIG. 1B). The write pointer WP is incremented by the number of written words. If data are then intended to be read from the memory locations, then reference is made via the read pointer RP to the memory location having the address 24 and the data word D1 is read out.

After the reading operation (FIG. 1C) the read pointer RP points to the memory location having the address 25 and the write pointer WP points to the memory location having the address 30 after the write operation. After the write and read operations, the new data content of the queue comprises the data words D2–D6. The data words are buffer-stored in successive memory locations.

The disadvantage of such memory processing of a buffer memory is that memory locations in the buffer memory which have just been written to can only be read after the memory locations of the buffer memory which were written to chronologically before the memory location have been read. This is disadvantageous particularly when, in the buffer memory, only the data content of a few memory locations ever changes but the data content of the remaining memory locations mainly remains the same. Such a buffer memory architecture is thus very inflexible and the read-out is thus extremely time-consuming.

The following problem also frequently arises: the data transmitter, for example the bus, is inactive. If the bus is activated, then very large data packets must be written all at once to the buffer memory in a very short time. The data receiver, for example the central processing unit, however, frequently has a very much higher clock frequency than the data transmitter and, consequently, can read data from the buffer memory very much more rapidly than the data transmitter can write data thereto. As a result, the performance of the buffer memory is limited by the size of the buffer memory and the capability of the data transmitter to write data packets to the buffer memory as fast as they are read by the data receiver.

However, a FIFO buffer memory architecture according to the prior art only ever allows a data packet which maximally corresponds to the size of the buffer memory to be read by the data transmitter before the buffer memory can be written to again by the data transmitter. This processing procedure is very slow and, moreover, drastically limits the performance of the entire system.

In order to increase the performance of a buffer memory, therefore, it is necessary to provide a very large memory module (RAM) as buffer memory which can completely hold the volume of data to be transferred. This is exceedingly cost-intensive, however, particularly in the case of a microprocessor.

In the case of the data packets which are transmitted directly in succession by the data transmitter, it is frequently the case that only a few individual items of data change while the remaining data remain the same. This is the case, for example, with a data mask, a data form or the like. However, in a buffer memory of the generic type, the total volume of data is always written to the memory and then also read out again in its entirety. This is exceedingly complicated and takes a very long time as well.

Furthermore, with the existing FIFO memory architecture it is not possible simultaneously to write data to the memory and read data from the memory.

SUMMARY OF THE INVENTION

It is accordingly an object of the invention to provide a buffer memory configuration, which overcomes the above-mentioned disadvantages of the prior art devices and methods of this general type and which is characterized by a more flexible, powerful buffer memory architecture.

With the foregoing and other objects in view there is provided, in accordance with the invention, a buffer memory configuration, comprising:

a data transmitter, a data receiver, and a buffer memory connected for data communication signal lines between the data transmitter and the data receiver;

the buffer memory including a memory for data buffering, an address/data bus connected to the memory, and a memory management unit controlling reading from and writing to the memory via the address/data bus;

the memory being mappable onto an address space exactly half as large as the memory, a first half of the memory defining a first memory page and a second half of the memory defining a second memory page, each address in the address space being assigned a respective memory location on each of the memory pages; and the memory management unit generating a significant bit assigning in each case the two memory locations having the same address to the address space of the first memory page and to the address space of the second memory page.

In accordance with an added feature of the invention, the data transmitter and the data receiver are a respective one of a bus with a multiplicity of bus lines and a central processing unit, each of the bus and the central processing unit being operable as the data transmitter and the data receiver.

In accordance with an additional feature of the invention, the memory has at least one end point, each the end point being assigned a base address and an end address, and each the end point being adapted to occupy either memory locations of the first memory page or memory locations of the second memory page or memory locations of the first and second memory pages with the same addresses.

In accordance with another feature of the invention, the end points are adapted to store therein at least one data packet each having at least a data size of an individual memory location.

In accordance with a further feature of the invention, an end address of an end point is defined by a maximum data packet size transmitted by the data transmitter.

The buffer memory configuration according to the invention makes it possible to use a standard memory, which is typically designed as a simple RAM, to achieve a processing procedure of data writing and reading operations which has a much higher performance than compared with the prior art. It is advantageous that, compared with the prior art, this necessitates a much smaller memory than would be required by the maximum incoming volume of data.

Typically, however, data transmitter and data receiver are not necessarily designed as central processing unit and as USB bus. The central processing unit and the USB bus may in this case function alternately both as data transmitter and data receiver.

In accordance with again an additional feature of the invention, the memory management unit includes at least one of the following elements:
  a first address generator for generating the addresses of the first memory page;
  a first read/write pointer for reading data from and writing data to memory locations of the first memory page;
  a second address generator for generating the addresses of the second memory page;
  a second read/write pointer for reading data from and writing data to memory locations of the second memory page;
  a SWAP unit for controlling a change-over between the first and second memory pages.

In accordance with again an added feature of the invention, at least one register device is provided for storing the base addresses of the end points.

In accordance with again another feature of the invention, at least one of the data transmitter and the data receiver generate a direction bit defining a direction of the data transfer.

In accordance with again a further feature of the invention, the memory management unit is adapted to identify whether an end point is empty or full.

In accordance with yet an added feature of the invention, the end points of a given memory page are writeable to and readable from individually and in any order, independently of a content of remaining end points of the given memory page.

In accordance with yet an additional feature of the invention, each address within the address space of an end point can be set selectively for writing thereto and for reading therefrom.

In accordance with yet another feature of the invention, a further unit is connected to the bus via further signal lines, the further unit being another central processing unit, a coprocessor, and/or at least one peripheral unit.

In accordance with yet a further feature of the invention, a synchronization device synchronizes the clock signals of the data transmitter and of the data receiver with one another.

With the above and other objects in view there is also provided, in accordance with the invention, a method of operating the above-described buffer memory configuration. The method comprises defining a given configuration wherein:
  each end point having exclusively memory locations of the first memory page is writeable to by the data transmitter;
  the SWAP unit switches an assignment of written-to end points based on the significant bit from the data transmitter to the data receiver; and
  the end points whose assignment has been changed with regard to the significant bit are readable by the data receiver.

In the alternative, or additionally, further configuration may be defined, wherein:
  each end point having exclusively memory locations of both memory pages with respectively identical addresses is simultaneously writeable to by the data transmitter and readable from by the data receiver;
  the SWAP unit switches the assignment of the recently written-to end point based on the significant bit from the data transmitter to the data receiver; and
  the end points are again writeable to by the data transmitter and readable from by the data receiver.

Accordingly, the buffer memory configuration may be selectively operated in the given configuration, in the further configuration, or in the given and the further configuration.

In other words, the buffer memory configuration according to the invention affords the possibility that, simultaneously, data can be written to the memory by the data transmitter and data can be read from the memory by the data receiver. In this way, the flexibility of the buffer memory architecture is also enhanced.

Furthermore, it is possible to write to and read from individual end points, which may comprise a plurality of memory locations, for example, in a targeted manner without the data content of the remaining end points changing. It is advantageous that the data content of the remaining end points need not then also be read out. In this way it is possible to channelize and structure the data transfer. Moreover, data to be transmitted can be transmitted very rapidly in this way.

The invention is particularly advantageous if data are to be transmitted in the form of a data mask, a form or the like in which only individual items of data ever change. These respectively changing items of data can then be forwarded very rapidly.

The individual end points can be operated both in the so-called single buffer mode and in the dual buffer mode. In a very advantageous application, one portion of the end points is operated in the single buffer mode, while the other portion of the end points is operated in the dual buffer mode.

The invention is particularly advantageous in a so-called USB module. The bus is then a USB bus. However, the bus can also connect a further processor, a coprocessor or at least one peripheral to the buffer memory configuration.

A further favorable application of the buffer memory configuration is in a microprocessor, a microcomputer or in a communications network.

Other features which are considered as characteristic for the invention are set forth in the appended claims.

Although the invention is illustrated and described herein as embodied in buffer memory configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
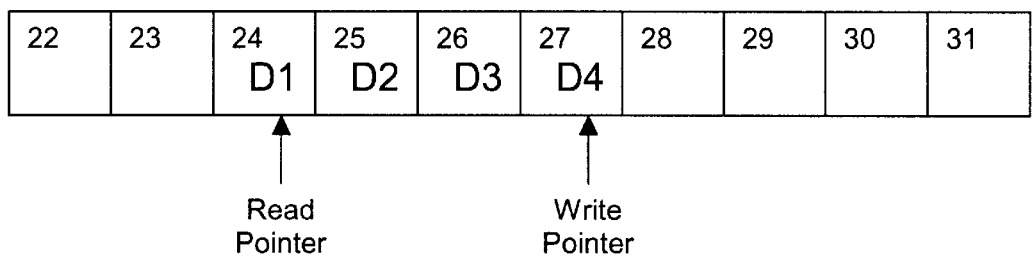
FIG. 1 (1A, 1B, 1C) is a schematic view illustrating FIFO buffer memory management according to the prior art.
Figure 1B:
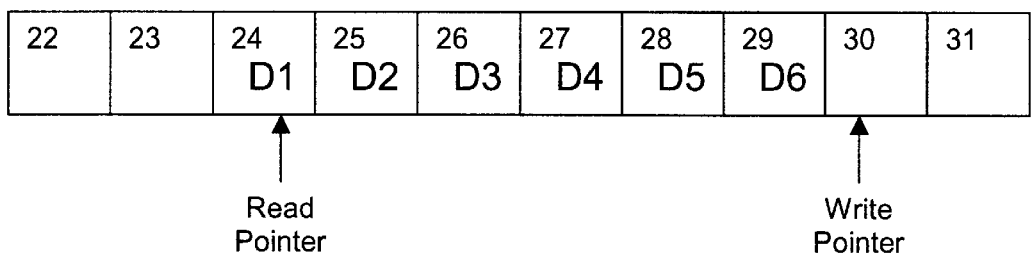
Figure 1C:
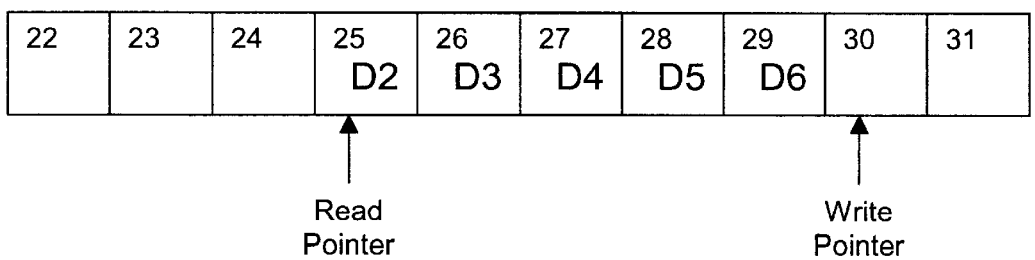
Figure 2:
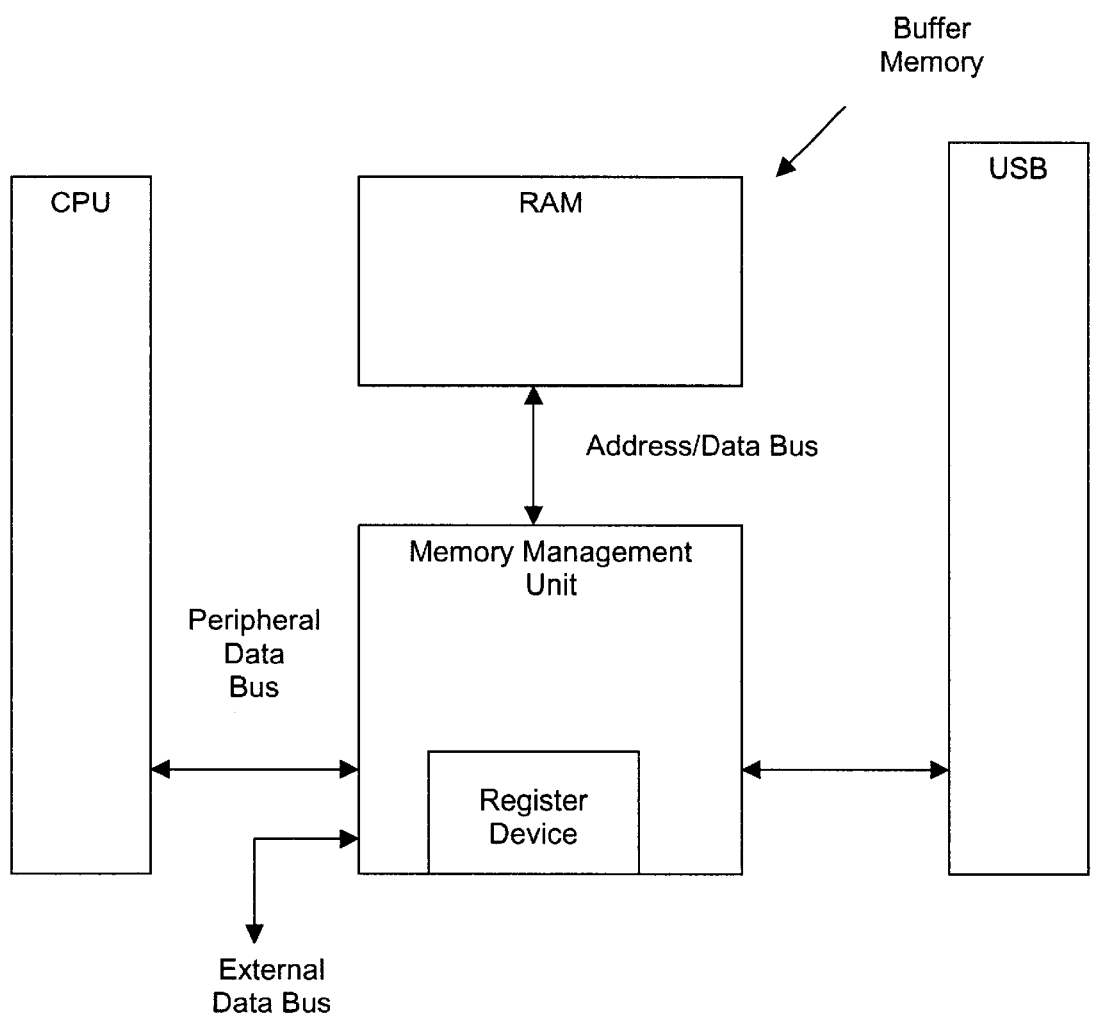
FIG. 2 is a general block diagram of the buffer memory device according to the invention.

Referring now to the figures of the drawing in detail and first, particularly, to FIG. 2 thereof, there is seen a general block diagram of the architecture of a buffer memory device according to the invention, wherein BM designates the buffer memory configuration itself. The buffer memory configuration BM has a memory RAM. As suggested by the designation, the memory RAM is a simple random-access memory (RAM). However, it is also conceivable to use any other writable memory, such as, for example, a DRAM, an SRAM, an FRAM, etc. The memory RAM may be present as a RAM module in discrete form or it may be monolithically integrated, for example in a silicon chip together with the buffer memory.

In the present example, the memory RAM is connected to a memory management unit MMU by a single address/data bus ADB. The address/data bus ADB in this case has a multiplicity of address lines and data lines.

The memory management unit MMU contains a register device SFR. The register device SFR typically contains an address register and a length register. The addresses of the memory locations are stored in the address register, while the length or the packet size of the stored data is stored in the length register.

The memory RAM and also the memory management unit MMU are connected between a central processing unit CPU. and a bus USB. The central processing unit CPU may be a processor or a microprocessor, for example. The bus USB is a universal serial bus (USB) in the present example. However, any other bus having serial or parallel operation may also be used as the bus. It is also conceivable for the bus USB to form the interface to a further central processing unit, a coprocessor or at least one peripheral unit.

In the present example, the memory management unit MMU is connected to the central processing unit CPU by the so-called peripheral data bus (PD bus/PDB) . Among other things, the PD bus PDB also addresses the register device SFR of the memory management unit MMU. Peripheral units can be coupled to the memory management unit MMU via a further bus, the so-called external data bus (XDB).

The memory management unit MMU is additionally connected to the bus USB via a multiplicity of signal lines. These signal lines comprise address lines, data lines and control lines. The data on the data and address lines may be present in multiplexed or non-multiplexed form.

Figure 3:
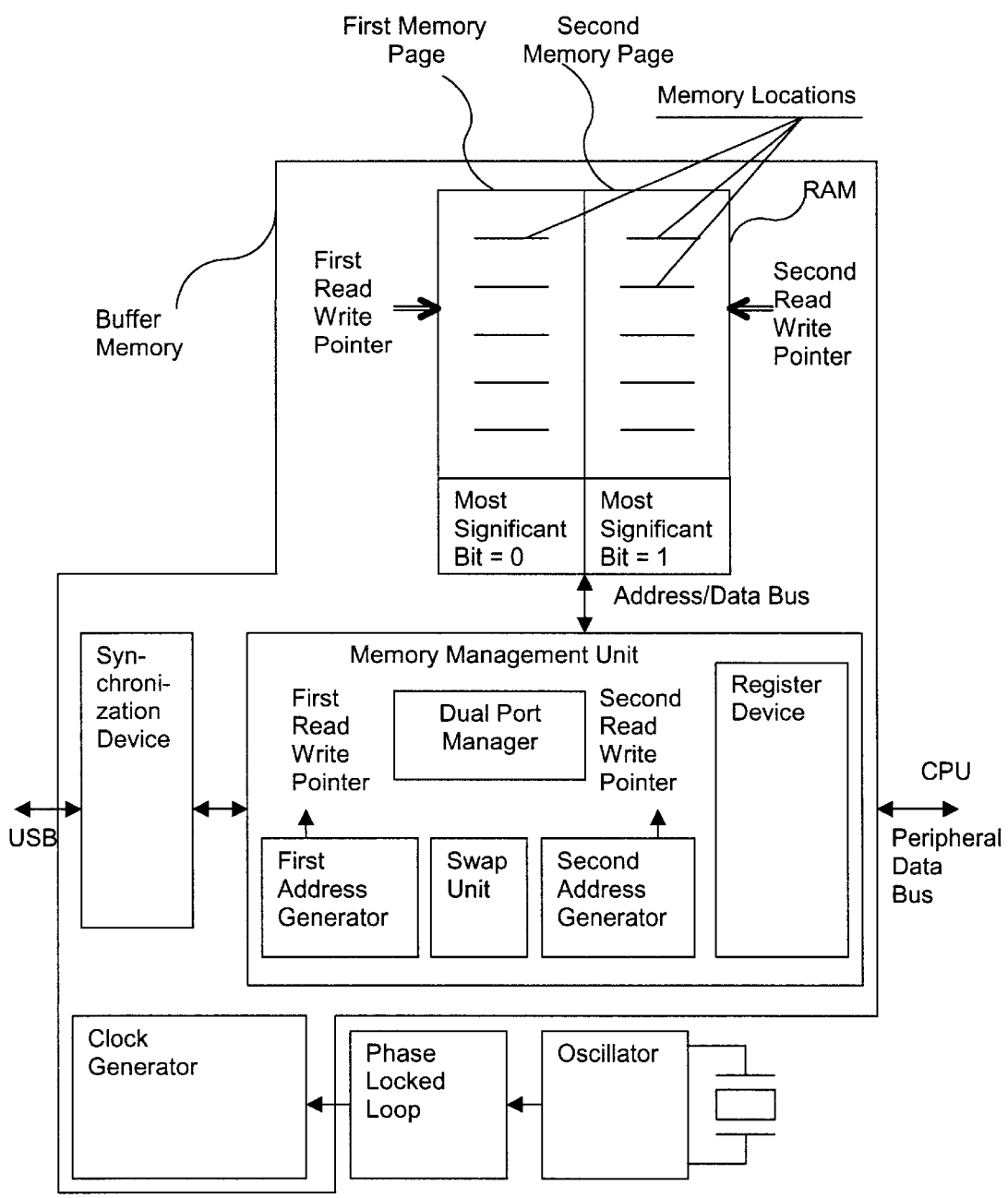
FIG. 3 is a more detailed block diagram of a buffer memory device according to the invention.

FIG. 3 shows a detailed block diagram of the buffer memory device according to the invention. Identical or functionally identical elements are provided with the same reference symbols in accordance with FIG. 2.

Referring now to FIG. 3, the buffer memory configuration BM shown therein includes a memory management unit MMU, a memory RAM, a synchronization device UIF, and a clock generator CKG. The buffer memory configuration BM is connected to the bus USB, on the one hand, and to the central processing unit CPU via the PD bus PDB, on the other hand. Furthermore, an oscillator OSC can be connected to the clock generator CKG of the buffer memory configuration BM via a phase locked loop PLL.

The memory management unit MMU contains a so-called dual port manager DPM, a SWAP unit SWU and also a register device SFR. Moreover, the memory management unit MMU contains means for address generation. These means comprise a first address generator UAG and a second address generator CAG in the present example. The address generators UAG, CAG comprise a counter and a pointer in the simplest design. In the present example, the first address generator UAG drives a first read/write pointer RWPO and the second address generator CAG drives a second read/write pointer RWP1.

The memory RAM is addressed by the dual port manager DPM via the address/data bus ADB. The dual port manager DPM then decides from which of the two sides the addresses of the memory RAM can be read.

The bus USB and the central processing unit CPU typically have a different clock frequency and a different phase angle. It is thus necessary to synchronize the CPU clock and the USB clock with one another. For this reason, a synchronization device UIF is typically connected between the bus USB and the memory management unit MMU. The synchronization device UIF synchronizes the clock signal coupled in from the USB-bus with the clock signal of the memory management unit MMU, which corresponds to the clock frequency of the central processing unit CPU. A so-called handshake protocol is typically implemented to synchronize the USB clock and the CPU clock.

It is also possible, of course, to connect the synchronization device UIF between the memory management unit MMU and the central processing unit CPU. However, it is also conceivable for the clock frequencies and the phase angles of USB clock and CPU clock to be identical. Naturally, synchronization is unnecessary in that case.

As indicated in FIG. 3, the memory RAM is divided into a first memory page P0 and a second memory page P1. Furthermore, a significant bit is provided, the so-called MSB bit (most significant bit), which performs allocation to the first or to the second memory page P0, P1. If the MSB bit is MSB=0, for example, then the corresponding memory page P0 is connected to that of the central processing unit CPU. In the case of MSB=1, the corresponding memory page P1 is connected to the bus USB.

In the present invention, both the first and the second memory page P0, P1 has a dedicated address generator UAG, CAG having a respective dedicated read/write pointer RWP0, RWP1. Via such a read/write pointer RWP0, RWP1, it is possible both to read data from the memory RAM and to write data to the memory RAM.

Furthermore, as also indicated in FIG. 3, each memory page P0, P1 has an identical number of memory locations SPP. In this case, the memory RAM has exactly two respective memory locations SPP having the same address which differ from one another only in terms of the MSB (most significant bit). The total number of different memory locations SPP in the memory RAM typically depends on the number of address lines of the address/data bus ADB. Given eight address lines—in an 8-bit address bus—the memory consequently has a maximum of 256 different memory locations SPP. The total number of data lines of the address/data bus ADB then determines the volume of data which can be stored in each memory location SPP. For example, with the use of eight data lines, each memory location SPP has a data size of 32 bytes.

According to the invention, the memory RAM is subdivided into a plurality of end points EP. In this case, each end point EP can comprise a plurality of memory locations SPP. However, it is also possible for an end point EP to be occupied by a single memory location SPP or even by no memory location SPP.

The different operating modes of these ends points EP are described in more detail below with reference to FIGS. 4–6.

For writing and reading data to and from the end points EP, a distinction is fundamentally made between two different modes: the so-called single buffer mode and the dual buffer mode. In this case, it is possible to operate the end points of the memory RAM solely in the single buffer mode or solely in the dual buffer mode. In addition, it is also possible to operate a portion of the end points EP of the memory RAM in the dual buffer mode while at the same time the remaining end points EP are operated in the single buffer mode.

The structure of such buffer memories operated in the dual buffer mode and/or in the single buffer mode will initially be explained in more detail below with reference to the examples in FIGS. 4 to 6 of the drawing. Identical and functionally identical elements are identified with the same reference symbols in accordance with the preceding figures.

Figure 4:
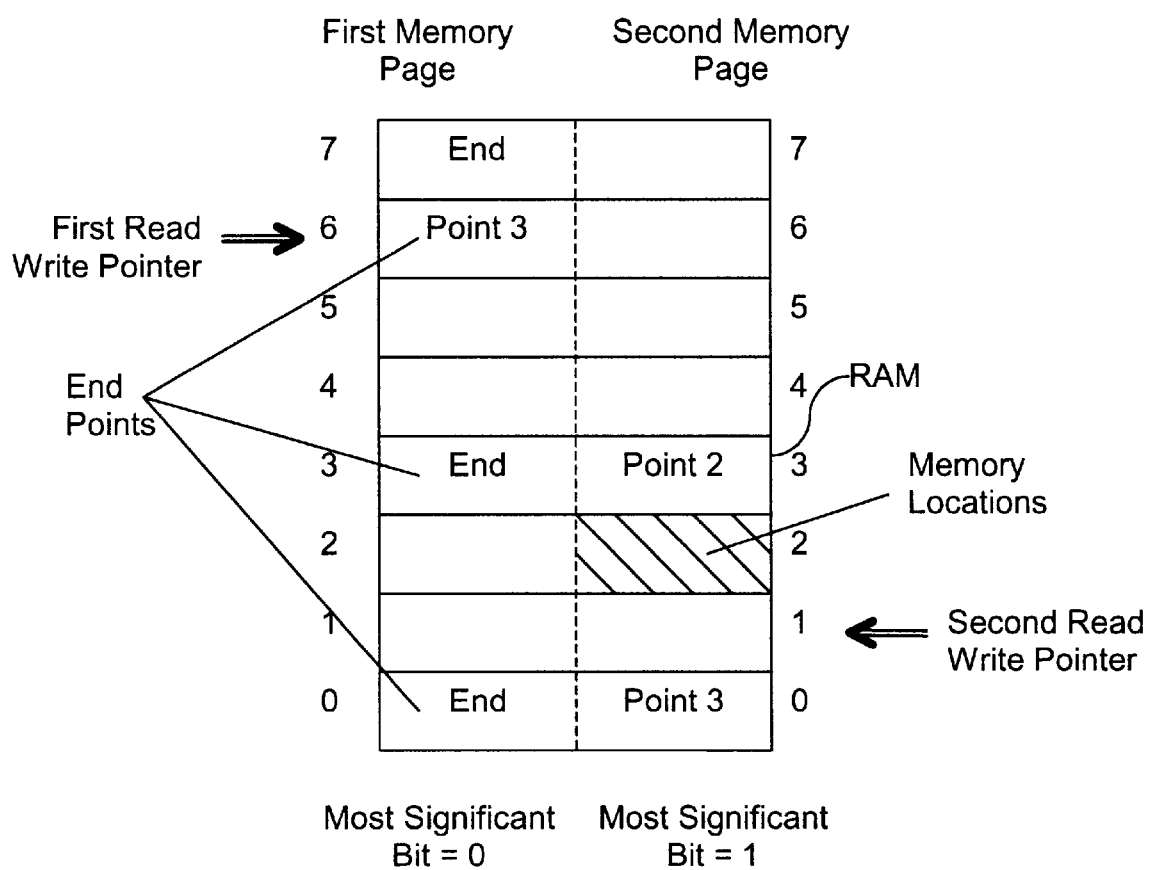
FIG. 4 is a schematic view of a buffer memory operated in dual buffer mode.

FIG. 4 shows a memory RAM which is operated exclusively in the dual buffer mode. To provide a better overview, the illustration of read/write pointers RWP0, RWP1 has been dispensed with here.

The 4-bit memory RAM in FIG. 4 has 16 memory locations SPP or eight memory location pairs which are indicated by the addresses 0 to 7. The memory location SPP having the address 2 and MSB=1 is emphasized by being hatched in an exemplary manner here. Together with the corresponding memory location SPP having the address 2 and an MSB=0, these memory locations SPP form a memory location pair. Consequently, each of the memory location pairs in each case comprises two memory locations SPP having the same address which differ only in terms of the MSB bit.

The memory RAM furthermore has three end points EP1–EP3. The end point EP1 comprises a single memory location pair having the address 0 in FIG. 4. The end point EP2 in this case comprises five memory location pairs having the addresses 1–5, where 1 is the base address and 5 specifies the end address. The end point EP3 is in this case formed by two memory location pairs having the addresses 6 and 7. In this case, 6 is the base address and 7 the end address. Moreover, a first read/write pointer RWP0 for the first memory page P0 and a second read/write pointer RWP1 for the second memory page P1 are illustrated in FIG. 4. Consequently, in the dual buffer mode the end points EP simultaneously occupy memory locations SPP of the first memory page P0 and of the second memory page P1.

Figure 5:
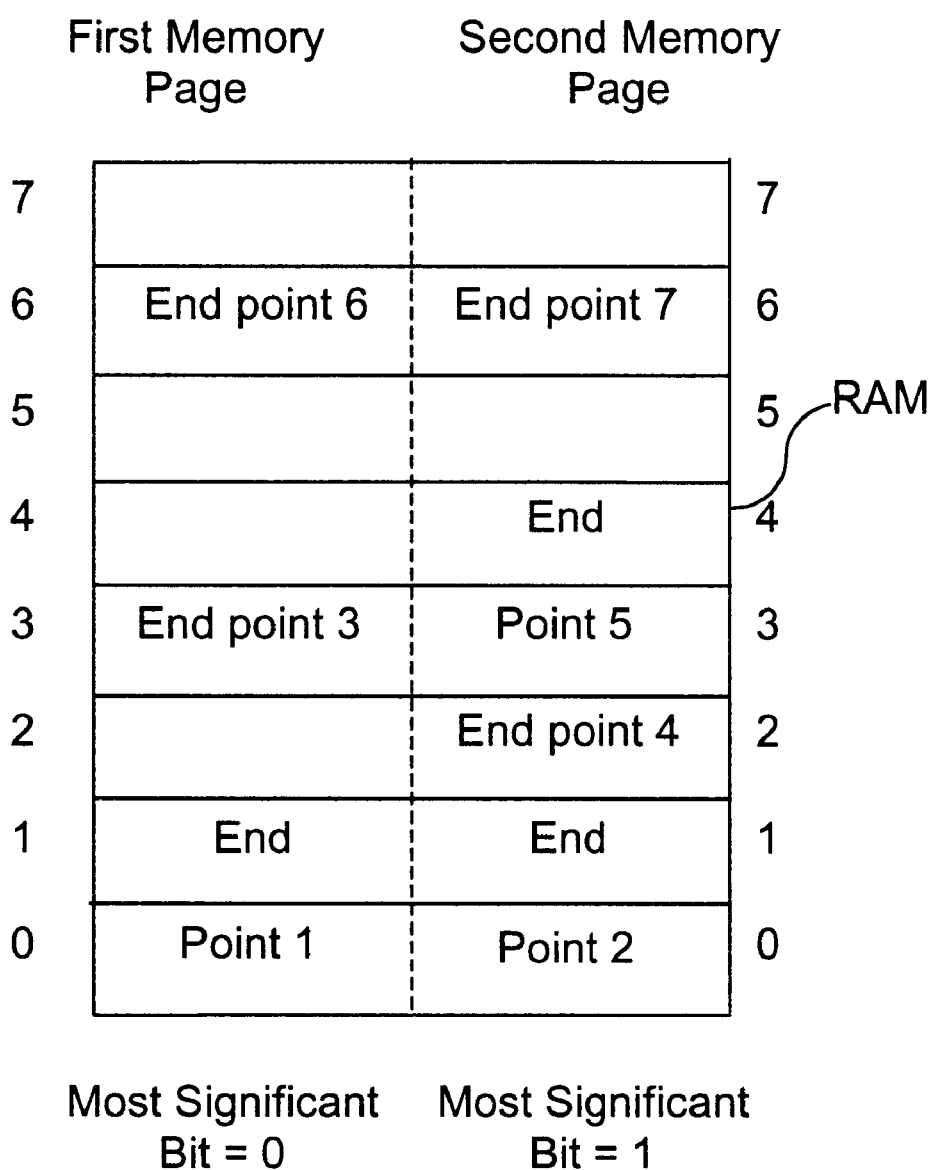
FIG. 5 is a similar view of a buffer memory operated in single buffer mode.
Figure 6:
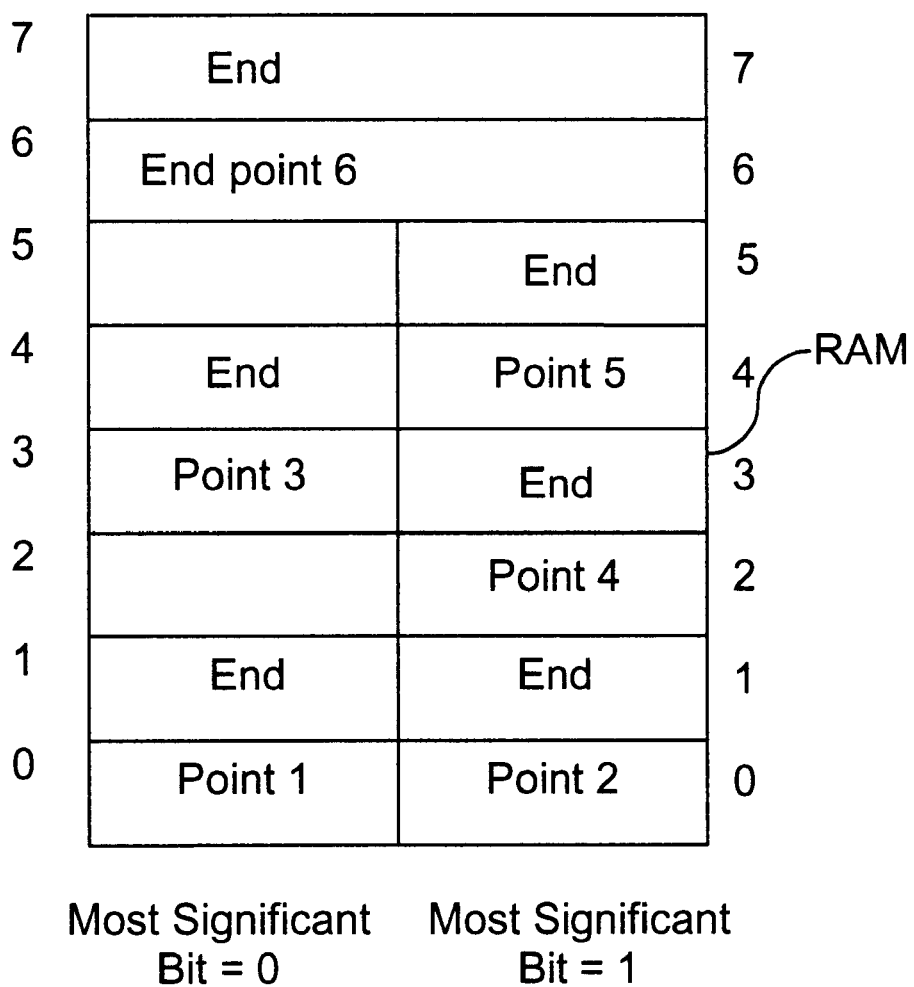
FIG. 6 is a similar view of a buffer memory operated both in the dual buffer mode and in the single buffer mode.

FIG. 5 shows a memory RAM which is operated exclusively in the single buffer mode. As in FIG. 4, the memory RAM in FIG. 5 has a 4-bit memory having a total of eight memory location pairs. Each memory location pair is assigned two memory locations SPP which differ only in terms of the MSB bit. The single buffer mode memory in FIG. 5 has seven end points EP1–EP7. Each of these end points EP1–EP7 inherently comprises exclusively memory locations SPP of one of the two memory pages P0, P1. That means that each of the end points EP1–EP7 is characterized by either MSB=0 or MSB=1. In this case, the different end points EP1–EP7 can be operated, that is to say written to and read from, completely independently of one another.

In the present example, the end points EP1, EP2 each comprise two memory locations SPP having the addresses 0 and 1 and differ only in terms of the MSB bit. The end points EP1, EP2 have the base address 0 and end address 1. The end points EP6, EP7 each comprise three memory locations SPP having the addresses 5–7 with the base address 5 and the end address 7. The end points EP6, EP7 likewise differ in terms of the MSB bit. As indicated in FIG. 5, it is also possible for one end point EP3 of the first memory page P0 to have its counterpart in two or more end points EP4, EP5 of the second memory page P1. In the present example, the end point EP3 comprises the addresses 2–4 of the first memory page P0, the corresponding addresses 2–4 of the second memory page P1 forming the end point EP4 having the address 2 and the end point 5 having the addresses 3–4.

The buffer memory configuration BM according to the invention additionally enables one portion of the end points EP of the memory RAM to be operated in the dual buffer mode and another portion of the end point EP simultaneously to be operated in the single buffer mode. This operating mode is illustrated in FIG. 6.

The end points EP1 and EP2 have the addresses 0 and 1. The end point EP3 having the address 2 to 5 of the first memory page P0 has its counterpart in the two end points EP4 and EP5 having the addresses 2–3 and 4 to 5, respectively of the second memory page P1. These end points EP1–EP5 are operated exclusively in the single buffer mode. The end point EP6 comprising the memory location pairs having the addresses 6 and 7, on the other hand, is operated exclusively in the dual buffer mode.

The exact method of operation of a memory RAM which is operated in the single buffer mode and in the dual buffer mode is explained in more detail below.

In the dual buffer mode an end point EP can be written to and read from simultaneously by a data transmitter and a data transmitter. This end point EP is subsequently changed over, under the control of the MSB bit of the SWAP unit SWU. The respective other page of the end point EP can then again be written to and read from by the central processing unit CPU and by the bus USB. The changeover in this case takes place fully automatically.

In the so-called single buffer mode, an end point EP can firstly be written to by a data transmitter. This means that the end points EP or memory locations SPP of the respective other memory page P0, P1 which correspond to this end point EP remain empty in this case. They can be utilized for another end point EP, for example. In the single buffer mode, then, a distinction is not made between the first and the second memory page P0, P1. After the changeover by the SWAP unit SWU, the end point EP that has just been written to can be read again. The changeover mechanism takes place fully automatically, similarly to the dual buffer mode.

In the single buffer mode and in the dual buffer mode, the central processing unit CPU and the bus USB can function both as data transmitter and data receiver.

Both in the dual buffer mode and in the single buffer mode, each of the end points EP can be operated fully independently of the remaining end points EP of the memory RAM. As a result, it is possible to write data in a targeted manner to the memory RAM and read these data out again in a targeted manner without the remaining data, which have not changed in this period of time, likewise having to be read out. In this way, it is possible to channelize and structure the data transfer. Individual items of data can thus be transferred from a data transmitter to a data receiver very rapidly and in a targeted manner. As a result, the performance and/or the rapidity of the buffer memory configuration can be considerably increased.

This concept is preferably employed when, for example, a mask, a form or the like is to be transmitted from the data transmitter to the data receiver. In the case of such an application, only individual items of data change (for example in the case of a form) but they must then be read out very rapidly. The remaining data of the form, which typically change very rarely, do not have to be read out every time.

In addition, a specific and particularly advantageous application option of the invention is in the keyboard control or mouse control of a PC. In this case, only individual parameters ever change in comparison with the total volume of data. Moreover, these parameters change comparatively infrequently. However, if such a change takes place, then the changed data must be forwarded as rapidly as possible. If the total volume of data is transmitted each time a parameter of this system changes, then it is either necessary to provide a comparatively large buffer memory or the system has considerable, undesirable inertia. However, these disadvantages are avoided by the memory architecture according to the invention.

If an end point is operated in the dual buffer mode, then the corresponding memory page is automatically changed over, i.e., the MSB bit is changed in accordance with the data transfer direction.

The memory RAM operated in the single buffer mode behaves similarly to the memory RAM operated in the dual buffer mode. In the single buffer mode, however, the MSB bit is not changed. In contrast to the dual buffer mode operation, it is not possible in the single buffer mode operation for both memory pages P0, P1 to be full. An end point EP is declared to be full when one of the jointly used memory pages P0, P1 is full. An end point EP is declared to be empty when all the memory locations SPP of the jointly used memory page P0, P1 are empty. For this case of an empty memory RAM, one of the two end points EP of the memory pages P0, P1 can be written to. The memory RAM is then declared to be full again.

The direction of a data transfer is determined by way of a so-called direction bit. The direction bit is typically predetermined by the data transmitter. The direction bit thus defines which of the two subscribers, that is to say the central processing unit CPU or the bus USB, is the data transmitter and which is the data receiver.

The number of end points EP in the memory RAM is adjustable. In this case, the base addresses of each end point EP are stored in the register device SFR. The actual access address of each end point EP is generated by addition of the base address, of the MSB bit and of the offset which is generated by the corresponding counter.

In an advantageous development, the addresses can be realized by a simple OR function. In this case, however, the base address must be a multiple of $2^n$ and the offset address must assume a value between 0 and $2^{n-1}$. It is ensured in this case that no bit position in both summands of these addresses is occupied by 1.

The end points EP typically have a size of 8, 16, 32, 64 bytes. However, smaller end points EP of the order of magnitude of 0, 1, 2, 4 bytes are also conceivable. Of course, the data size of all the end points EP together must not exceed the data size of the entire memory RAM.

The maximum data size of an end point EP is defined by its base address and its end address. However, it is also possible to store a smaller volume of data within an end point EP. The maximum length of an end point EP defined by the base address and end address as well as the actual size of the volume of data stored in the end point EP are stored in a length register. The length register is part of the register device SFR.

Each of the end points EP can be interchanged via the so-called MSB bit. As a result of this interchange, the length information and the address information of the respective end points EP are also interchanged. The base addresses of the respective end points EP are in this case stored in a so-called base address register within the register device SFR.

The SWAP unit SWU and the register device SFR are controlled by the central processing unit CPU. The SWAP unit SWU additionally contains a logic circuit which identifies whether an end point EP is full or empty.

A further significant bit, the so-called least significant bit (LSB) or LSB bit, which is stored in the length register in this case, specifies the actual length of the volume of data stored in the respective end points or memory locations. The logic arrangement in the length register has an end state identification arrangement which identifies whether the end address of the corresponding end point EP has been reached and, consequently, the respective end point EP is full.

Since length registers are usually of very large design, they can also be arranged monolithically in the memory RAM. In this way, chip area can additionally be saved by the saving of this comparatively large length register.

The present invention is particularly advantageous if the buffer memory configuration is integrated in a microcomputer or a microprocessor. In particular, application in a USB module also proves to be extremely favorable.

However, it is also conceivable to use the buffer memory configuration according to the invention for data transfers in a communications network, a personal computer or the like.

The present buffer memory architecture consequently makes it possible for the memory RAM to manage independently the data to be transferred. The two memory pages P0, P1 in this case serve to decouple the data transmitter from the data receiver. In the exemplary embodiment, the central processing unit CPU is decoupled from the bus USB. Consequently, although both memory pages P0, P1 are virtually visible to the user, only one of the memory pages P0, P1 can ever be addressed for the data transfer from data transmitter to data receiver. In this way, overlapping of the writing cycles is avoided in that rapidly successive data of the data transmitter are stored in separate areas of the memory RAM. Consequently, the data to be transferred can be written "slowly" to the memory by the data transmitter since the next succeeding "fast" writing command goes to a different part of the memory RAM. Of course, this procedure can also be executed in the opposite direction.

As a result, it is advantageously possible for data transmitter and data receiver with different clock frequencies to write and read the data to and from the memory RAM. The addresses of the memory locations SPP of the memory RAM can be addressed in a known manner as in the case of a ring buffer memory. It is particularly advantageous, however, if the address generator changes over to the memory addresses of the memory RAM in an application-specific manner and thus not in a manner that is bound to a ring form.

Furthermore, the two memory pages p0, p1 also serve to decouple the typically completely asynchronous data transfer between the data transmitter and the data receiver.

We claim:

1. A buffer memory configuration, comprising:
    a data transmitter, a data receiver, and a buffer memory connected for data communication signal lines between said data transmitter and said data receiver;
    said buffer memory including a memory for data buffering, an address/data bus connected to said memory, and a memory management unit controlling reading from and writing to said memory via said address/data bus;
    said memory being mapable onto an address space exactly half as large as said memory, a first half of said memory defining a first memory page and a second half of said memory defining a second memory page, each address in the address space being assigned a respective memory location on each of said memory pages; and
    said memory management unit generating a significant bit assigning in each case the two memory locations having the same address to the address space of the first memory page and to the address space of the second memory page.

2. The buffer memory configuration according to claim 1, wherein said data transmitter and said data receiver are a respective one of a bus with a multiplicity of bus lines and a central processing unit, each of said bus and said central processing unit being operable as said data transmitter and said data receiver.

3. The buffer memory configuration according to claim 2, including further signal lines and a further unit connected to said bus via said further signal lines, said further unit being selected from the group consisting of a further central processing unit, a coprocessor, and at least one peripheral unit.

4. The buffer memory configuration according to claim 1, wherein said memory has at least one end point, each said end point being assigned a base address and an end address, and each said end point being adapted to occupy either memory locations of said first memory page or memory locations of said second memory page or memory locations of said first and second memory pages with the same addresses.

5. A buffer memory configuration, comprising:
    a data transmitter, a data receiver, and a buffer memory connected for data communication signal lines between said data transmitter and said data receiver;
    said buffer memory including a memory for data buffering, an address/data bus connected to said memory, and a memory management unit controlling reading from and writing to said memory via said address/data bus;
    said memory being mappable onto an address space exactly half as large as said memory, a first half of said memory defining a first memory page and a second half of said memory defining a second memory page, each address in the address space being assigned a respective memory location on each of said memory pages; and
    said memory management unit generating a significant bit assigning in each case the two memory locations having the same address to the address space of the first memory page and to the address space of the second memory page.

6. The buffer memory configuration according to claim 4, wherein an end address of an end point is defined by a maximum data packet size transmitted by said data transmitter.

7. The buffer memory configuration according to claim 4, wherein said memory management unit is adapted to identify whether an end point is empty or full.

8. The buffer memory configuration according to claim 4, wherein said end points of a given memory page are writeable to and readable from individually and in any order, independently of a content of remaining said end points of the given memory page.

9. The buffer memory configuration according to claim 4, wherein each address within the address space of an end point can be set selectively for writing thereto and for reading therefrom.

10. The buffer memory configuration according to claim 1, wherein said memory management unit includes at least one of the following elements:
    a first address generator for generating the addresses of the first memory page;
    a first read/write pointer for reading data from and writing data to memory locations of the first memory page;
    a second address generator for generating the addresses of the second memory page;
    a second read/write pointer for reading data from and writing data to memory locations of the second memory page;
    a SWAP unit for controlling a change-over between the first and second memory pages.

11. A method of operating the buffer memory configuration according to claim 10, which comprises defining a given configuration wherein:
    each end point having exclusively memory locations of the first memory page is writeable to by the data transmitter;
    the SWAP unit switches an assignment of written-to end points based on the significant bit from the data transmitter to the data receiver; and
    the end points whose assignment has been changed with regard to the significant bit are readable by the data receiver.

12. A method of operating a buffer memory configuration according to claim 11, which comprises defining a further configuration, wherein:

each end point having exclusively memory locations of both memory pages with respectively identical addresses is simultaneously writeable to by the data transmitter and readable from by the data receiver;

the SWAP unit switches the assignment of the recently written-to end point based on the significant bit from the data transmitter to the data receiver; and the end points are again writeable to by the data transmitter and readable from by the data receiver.

13. The method according to claim 12, which comprises selectively operating the buffer memory configuration in the given configuration, in the further configuration, or in the given and the further configuration.

14. A method of operating a buffer memory configuration according to claim 10, which comprises defining a given configuration, wherein:

each end point having exclusively memory locations of both memory pages with respectively identical addresses is simultaneously writeable to by the data transmitter and readable from by the data receiver;

the SWAP unit switches the assignment of the recently written-to end point based on the significant bit from the data transmitter to the data receiver; and the end points are again writeable to by the data transmitter and readable from by the data receiver.

15. The buffer memory configuration according to claim 1, which further comprises at least one register device storing the base addresses of the end points.

16. The buffer memory configuration according to claim 1, wherein at least one of said data transmitter and said data receiver generate a direction bit defining a direction of the data transfer.

17. The buffer memory configuration according to claim 1, which further comprises a synchronization device for synchronizing clock signals of said data transmitter and of said data receiver with one another.

18. In combination with a USB module, at least one buffer memory configuration according to claim 1 in the USB module.

19. In combination with a microcontroller, a buffer memory configuration according to claim 1 integrated in the microcontroller.

* * * * *